Patented May 8, 1934

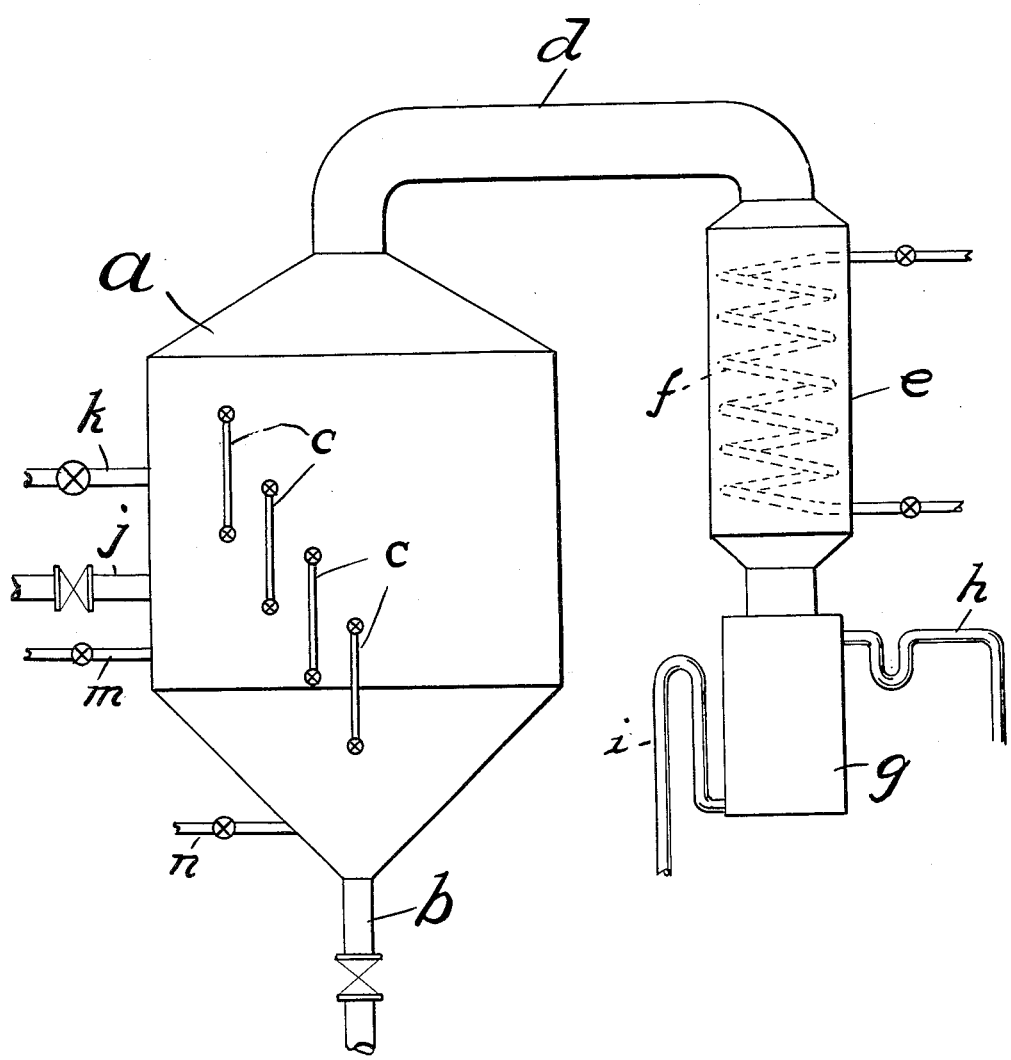

1,957,750

UNITED STATES PATENT OFFICE 1,957,750

PROCESS OF RECOVERING SOLVENT FROM SLUDGE

Daniel Irving Ashworth, Wappingers Falls, N. Y., assignor to The De Laval Separator Company, New York, N. Y., a corporation of New Jersey Application July 11, 1931, Serial No. 550,149

7 Claims. (Cl. 196—15)

It is customary for many dry cleaners to purify their dirty solvent by treatment with a water solution of caustic soda or other alkali by any one of a number of commercial processes. This leaves in the treating apparatus a residuum in the form of a sludge consisting a dirt, water, soap, etc., and a considerable amount of solvent. In purifying solvent it is customary to bubble the solvent through a solution containing 4% to 20% of caustic soda or other alkali. Where, hereinafter, the term "normal sludge" is used, it is intended to include all sludges made by the use of a solution of this character. The consistency of this sludge may vary from that of a thin soup to that of a mud and ordinarily contains from 30% upward of solvent.

Many attempts have been made to recover this waste solvent by distillation, etc., but it has been found that the soaps and other impurities present cause such violent foaming that the amount of coloring matters and of solids carried over with the vaporized solvent make the distillate unusable.

The object of my invention is the recovery of this waste solvent in a useful condition, thus reducing the cost of operation and eliminating a fire hazard that exists where this sludge is dumped into sewers.

I have found that if the sludge is diluted with a quantity of water and properly heated, most of the solvent will separate from most of the impurities. A large part of the impurities may then be drawn from the bottom of the tank. If the remaining solvent, with such impurities as it still contains, is again diluted with water, it is possible to distil off the solvent and part of the water, condense them and separate the water from the solvent, which is then in condition for re-use.

I have found the following procedure particularly efficacious.

To one volume of normal sludge I add two volumes of water and raise the temperature of the mixture to the emulsion breakage point, which is at or just below, that is, within 10° F. of, the incipient boiling temperature, immediately shut off the heat and allow to stand quiescent for completion of the emulsion breakage. I have found that for efficient results it is necessary that the temperature be held within a very narrow range. Ebullition at this stage for even a few minutes will result in the formation of a new emulsion more stable than the original one. If the temperature is too low there will be no break. I have found that for best results the temperature should be held between 205° F. and the boiling point until after the break is completed, and preferably, also, during gravity separation, although with only slightly inferior results the mixture may be allowed to cool slowly while separation takes place. The upper layer then consists of partly purified solvent. From the bottom I draw off the water and sludge. To the remainder I add one volume of water and apply heat to cause rapid boiling, condense the vapors driven off, which will consist of a mixture of water and solvent, and separate the water from the solvent, which is suitable for immediate re-use.

The execution of the process is not limited to the employment of any specific apparatus, but to enable the process to be carried out efficiently and economically without the necessity for experiment, I append hereto a drawing, the single figure of which is a vertical sectional view of an apparatus that I have found to operate successfully.

$a$ is a steam-jacketed still provided with a waste draw-off pipe $b$ from the bottom. $c, c, c, c,$ are gage glasses that allow the operator to determine the levels of the different layers in the still. $d$ is a vapor pipe leading to a condenser $e$ cooled by a water coil $f$. At the bottom of the condenser is a collecting chamber $g$ with an upper outlet $h$ for solvent and a lower water outlet $i$ turned up nearly to the level of the solvent outlet. $j$ is an inlet pipe for sludge from the pump and tank not shown and $k$ is a water inlet. $m$ is an inlet for steam to the jacket and $n$ is an outlet therefrom for condensate.

In operation, sludge is pumped in through pipe $j$ until it shows at the correct height on a gage glass. Water is pumped in through inlet $k$ to dilute the charge, which is then heated to near the boiling point and allowed to separate as much as it will by gravity. The dirt and a large part of the water are then drawn off through the waste pipe $b$, the remainder is again diluted and distillation started. As vapors are condensed, the liquid falls into the chamber $g$, wherein the water settles to the bottom and the solvent collects above it. With outlets $h$ and $i$ correctly placed, there will be continuous separate discharge of both water and solvent, which may be piped to any desired locations.

Before the sludge is drawn from the solvent treating apparatus, it may be further diluted with water to facilitate its outflow. It is possible to use, in the solvent treating apparatus, a large excess of water, thus producing a sludge so abnormally diluted that it may be distilled without any further addition of water. Such predilution is within the scope of my invention.

It is possible to distill from the mixture the solvent and some of the water without drawing off part of the sludge, but I prefer to remove a large part of the sludge before distilling.

It also is possible, without distilling, to recover from caustic sludge a partially purified solvent which may be further purified by subjection to alkali treatment or to distillation in a separate apparatus.

The reason for the efficacy of my process has not been determined with certainty. It may be due to a momentary partial boiling of the discontinuous phase. It may be because of a reduction of the surface tension to so low a value as to permit disruption of the continuous phase, or it may be that heat causes expansion of the discontinuous phase to several times that of the continuous emulsion skin.

Having now fully described my invention, what I claim and desire to protect by Letters Patent is:

1. That process of recovering dry cleaners' solvent which includes passing dirty solvent through an aqueous solution of alkali and recovering the solvent for re-use and producing a sludge solution diluted to not more than half the concentration of normal sludge, increasing the temperature of such dilute sludge to close to and just below the boiling point, holding at that temperature while gravity separation takes place, and separately withdrawing the lower layer of water and dirt.

2. The process of recovering dry cleaners' solvent from alkaline sludge which includes mixing therewith not less than an equal quantity of water, increasing the temperature to close to and just below the boiling point, holding at that temperature during the emulsion breaking stage, and then allowing gravity separation of water and dirt and withdrawing the aqueous layer.

3. The process of recovering dry cleaners' solvent from alkaline sludge which comprises adding to one volume of normal sludge approximately two volumes of water, increasing the temperature while avoiding boiling to within 10° F. of the boiling point and breaking the emulsion, immediately shutting off the heat and allowing the diluted solvent to stand quiescent until the breakage of the emulsion is substantially completed and separating the solvent from the sludge solution.

4. The process of recovering dry cleaners' solvent from alkaline sludge which comprises adding to one volume of normal sludge approximately two volumes of water, increasing the temperature while avoiding boiling to within 10° F. of the boiling point and breaking the emulsion, immediately shutting off the heat and allowing the diluted solvent to stand quiescent until the breakage of the emulsion is substantially completed and withdrawing the aqueous layer.

5. The process of recovering dry cleaners' solvent from alkaline sludge which comprises adding to one volume of normal sludge approximately two volumes of water, increasing the temperature to within 10° F. of the boiling point and breaking the emulsion while avoiding boiling, immediately shutting off the heat and maintaining the temperature substantially constant while allowing the diluted solvent to stand quiescent until the breakage of the emulsion is substantially completed and distilling and separating.

6. The process of recovering dry cleaners' solvent from alkaline sludge which comprises adding to one volume of normal sludge approximately two volumes of water, increasing the temperature to within 10° F. of the boiling point and breaking the emulsion while avoiding boiling, immediately shutting off the heat and maintaining the temperature substantially constant while allowing the diluted solvent to stand quiescent until the breakage of the emulsion is substantially completed, withdrawing the aqueous layer and distilling and separating the solvent and the remaining water.

7. The process of recovering dry cleaners' solvent from alkaline sludge which comprises adding to one volume of normal sludge approximately two volumes of water, increasing the temperature to within 10° F. of the boiling point and breaking the emulsion while avoiding boiling, immediately shutting off the heat and maintaining the temperature substantially constant while allowing the diluted solvent to stand quiescent until the breakage of the emulsion is substantially completed, withdrawing the aqueous layer, adding water, and distilling and separating the solvent and water.

DANIEL IRVING ASHWORTH.